(12) United States Patent
Brabson

(10) Patent No.: US 8,260,311 B2
(45) Date of Patent: Sep. 4, 2012

(54) BINDING CACHE SUPPORT IN A LOAD BALANCED SYSPLEX

(75) Inventor: Roy F. Brabson, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1284 days.

(21) Appl. No.: 11/967,154

(22) Filed: Dec. 29, 2007

(65) Prior Publication Data

US 2009/0170490 A1    Jul. 2, 2009

(51) Int. Cl.
*H04W 72/00* (2009.01)
(52) U.S. Cl. .................. 455/453; 709/201; 455/561
(58) Field of Classification Search .............. 455/452.1, 455/452.2, 453; 709/201–203
See application file for complete search history.

(56) References Cited

U.S. PATENT DOCUMENTS

| | | | |
|---|---|---|---|
| 7,711,819 B2 * | 5/2010 | Ono et al. ............. | 709/226 |
| 2004/0136351 A1 | 7/2004 | Omae et al. | |
| 2004/0181603 A1 | 9/2004 | Rajahalme | |
| 2005/0207382 A1 | 9/2005 | Hirashima et al. | |
| 2006/0133337 A1 | 6/2006 | An et al. | |
| 2006/0155801 A1 * | 7/2006 | Brabson ............. | 709/201 |

OTHER PUBLICATIONS

David B. Johnson, Charles E. Perkins, Jari Arkko, Mobility Support in IPv6, Jun. 1, 2002.*
IBM, Sysplex Load Balancing for z/OS, Dec. 31, 2004.*

* cited by examiner

*Primary Examiner* — Vladimir Magloire
(74) *Attorney, Agent, or Firm* — Steven M. Greenberg, Esq.; Carey, Rodriguez. Greenberg & O'Keefe

(57) ABSTRACT

Embodiments of the present invention provide a method, system and computer program product for Mobile IPv6 binding cache support for a load balanced sysplex. In one embodiment of the invention, a load balancing sysplex can be configured for mobile device binding cache support. The sysplex can include a distributor coupled to different targets in a load balancing arrangement, where each of the targets can support a correspondent node enabled to communicate with a mobile device. A master binding cache can be coupled to the distributor and a binding cache manager can be coupled to the distributor. Notably, the binding cache manager can perform return routability with the mobile device and can provide a corresponding entry in the master binding cache for use by a target supporting a correspondent node for the mobile device. In one aspect of the embodiment, a replica of the master binding cache can be provided in each of the targets for use by supported correspondent nodes in communicating with different mobile devices associated with binding cache entries in the replica.

17 Claims, 2 Drawing Sheets

BINDING CACHE SUPPORT IN A LOAD BALANCED SYSPLEX

BACKGROUND OF THE INVENTION

1. Field of the Invention

The present invention relates to the field of mobile networking and more particularly to mobile networking in a multi-nodal network environment.

2. Description of the Related Art

With the advent of ubiquitous computing, a sheer number of electronic devices are capable of communicating through wireless technologies by using their Internet protocol (IP) addresses. Mobile IP version 6 (v6) is a protocol referred to as Mobile IPv6 that specifies the redirection of traffic between a mobile node disposed in a mobile device and other correspondent nodes throughout the network from one address to another in order to provide transparent Internet connectivity while a mobile device is moving. In this regard, the signaling for such redirection of traffic is done between the mobile and correspondent nodes.

In Mobile IPv6, a mobile node can be assigned two network addresses. The first assigned address is a home address allocated to the mobile node when the mobile node is at home network. The second assigned address is a care-of address allocated to the mobile node when the mobile node becomes attached to foreign network. Whenever the mobile node is assigned to a new care-of-address, the mobile node sends an update message to its home agent. The update message contains information pertaining to the current point of attachment for the mobile node. Therefore, when the home agent intercepts a packet toward the mobile node, the home agent encapsulates and redirects the packet to the current location of the mobile node.

Any node communicating with a mobile node is referred to as a "correspondent node". There are two known modes of communication between a mobile node and a correspondent node. The first mode, referred to as a bidirectional tunneling mode, does not require Mobile IPv6 support from the correspondent node. Rather, in the bidirectional tunneling mode, packets sent from the correspondent node are routed to the home agent and then tunneled by the home agent to the mobile node. Conversely, packets sent from the mobile node are tunneled to the home agent and then routed normally from the home network to the correspondent node.

The second mode, a route optimization mode, requires the mobile node to register a binding at the correspondent node. Thereafter, packets from the correspondent node can be routed directly to the care-of address of the mobile node. Likewise, packets sent from the mobile node are sent directly to the correspondent node. In this way, by routing packets directly to the care-of address of the mobile node, a shortest communications path is used, and congestion at the home agent and home link of the mobile node can be avoided.

Essential to route optimization is the successful binding on behalf of the correspondent node of the care-of-address for the mobile device. Request for Comment (RFC) 3775 in particular describes the process performed by a mobile node in registering its current location—namely its current care-of address—with any correspondent node with which the mobile node communicates. Generally, the binding process requires the use of binding update messages to register a binding between a home address of a mobile device and a current care-of address of the mobile device with those correspondent nodes with which the mobile device communicates.

Before a mobile node may send a binding update message, however, the mobile node first must complete a return routability procedure. The return routability procedure allows the correspondent node to determine, within reason, that the mobile node is addressable at both its home address as well as its care-of address. Only with this assurance is the correspondent node able to accept binding update messages from the mobile node. The return routability procedure is performed by testing whether packets addressed to the two claimed addresses are routed to the mobile node. The mobile node can pass the test only if it is able to supply proof that it received certain data which the correspondent node sends to those addresses.

Specifically, in a return routability procedure, each correspondent node keeps a secret key known as a keygen token and generates a nonce at regular intervals. The correspondent node uses the same secret key and nonce with each mobile node in communication with the correspondent node so that the correspondent node need not generate and store a new nonce for each new mobile node contacting the correspondent node. Each nonce can be identified by a nonce index. When a new nonce is generated, the new nonce is associated with a new nonce index. Resultant message exchanges are sent with an IPv6 "Mobility Header" in IPv6 packets.

Notably, the procedures outlined in RFC 3775 are sufficient for a single-node case, where the correspondent node "owns" all IP addresses assigned to the node. Yet, the procedures outlined in RFC 3777 fail to address a data center environment where in a sysplex any one of a number of target nodes share the same IP address and there is some form of load balancer that selects the particular target node for each new connection.

BRIEF SUMMARY OF THE INVENTION

Embodiments of the present invention address deficiencies of the art in respect to mobile networking and provide a novel and non-obvious method, system and computer program product for Mobile IPv6 binding cache support for a load balanced sysplex. In one embodiment of the invention, a load balancing sysplex can be configured for mobile device binding cache support. The sysplex can include a distributor coupled to different targets in a load balancing arrangement, where each of the targets can support a correspondent node enabled to communicate with a mobile device. A master binding cache can be coupled to the distributor and a binding cache manager can be coupled to the distributor.

Notably, the binding cache manager can perform return routability with the mobile device and can provide a corresponding entry in the master binding cache for use by a target supporting a correspondent node for the mobile device. In one aspect of the embodiment, a replica of the master binding cache can be provided in each of the targets for use by supported correspondent nodes in communicating with different mobile devices associated with binding cache entries in the replica. Alternatively, in another aspect of the embodiment, the master binding cache can be disposed in shared memory accessible both by the distributor and the targets in the sysplex.

In the former circumstance, binding cache management logic can be provided for each of the targets. The logic can include program code enabled to report persistent error conditions in an entry in the master binding cache to the distributor. The program code also can be enabled to delete the entry from the master binding cache. The program code yet further can be enabled to directly notify others of the targets of the persistent error conditions. Finally, each of the targets can include multiple different protocol stacks owning a single IP address in a distributed dynamic virtual IP address (DVIPA) configuration. Consequently, the binding cache manager can provide a corresponding entry for the single IP address for the protocol stacks in the master binding cache for use by a target supporting a correspondent node for the mobile device across the protocol stacks.

In another embodiment of the invention, a method for mobile device binding in a load balancing sysplex can be provided. The method can include receiving a binding update request from a mobile device in respect to a correspondent node hosted by a target load balanced in the sysplex, performing return routability with the mobile device and updating a binding cache with binding information for the mobile device, and replicating the binding cache to the target for use by the correspondent node in communicating with the mobile device. The method further can include subsequently receiving an update to the binding information, and forwarding a sysplex distribution message to the target with the update to the binding information.

The method yet further can include subsequently receiving notice from the target of a persistent error associated with the binding information, and deleting the binding information from the binding cache in response to receiving the notice. Finally, the method can include subsequently receiving a packet from the mobile device intended for a stack in the correspondent node, determining whether the stack supports route optimization, and rejecting the packet where the stack is determined not to support route optimization.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for sysplex wide binding cache management for mobile nodes. In accordance with an embodiment of the present invention, a sysplex can be provided including a distributor and multiple different target processing environments. The distributor can be configured to distribute processing loads to different ones of the different target processing environments. Each one of the different target processing environments further can be configured to support interactions with one or more mobile devices. In particular, the mobile devices each can support Mobile IPv6 type interactions including both a bidirectional tunnel mode of operation and a route optimization mode of operation.

Notably, the distributor can manage a single binding cache on behalf of the different target processing environments. In this regard, binding update requests for an intended correspondent node in the sysplex can be received and processed in the distributor, irrespective of the particular intended correspondent node. In turn, updates applied to binding cache can be propagated to the different target processing environments, each of which can maintain a shadow copy of the binding cache. Finally, route optimization can be managed for each of the different processing environments in the distributor by tracking route optimization support for each of the different processing environments on an environment by environment basis. In this way, Mobile IPv6 can be supported despite the load balancing arrangement of the sysplex.

Figure 1:
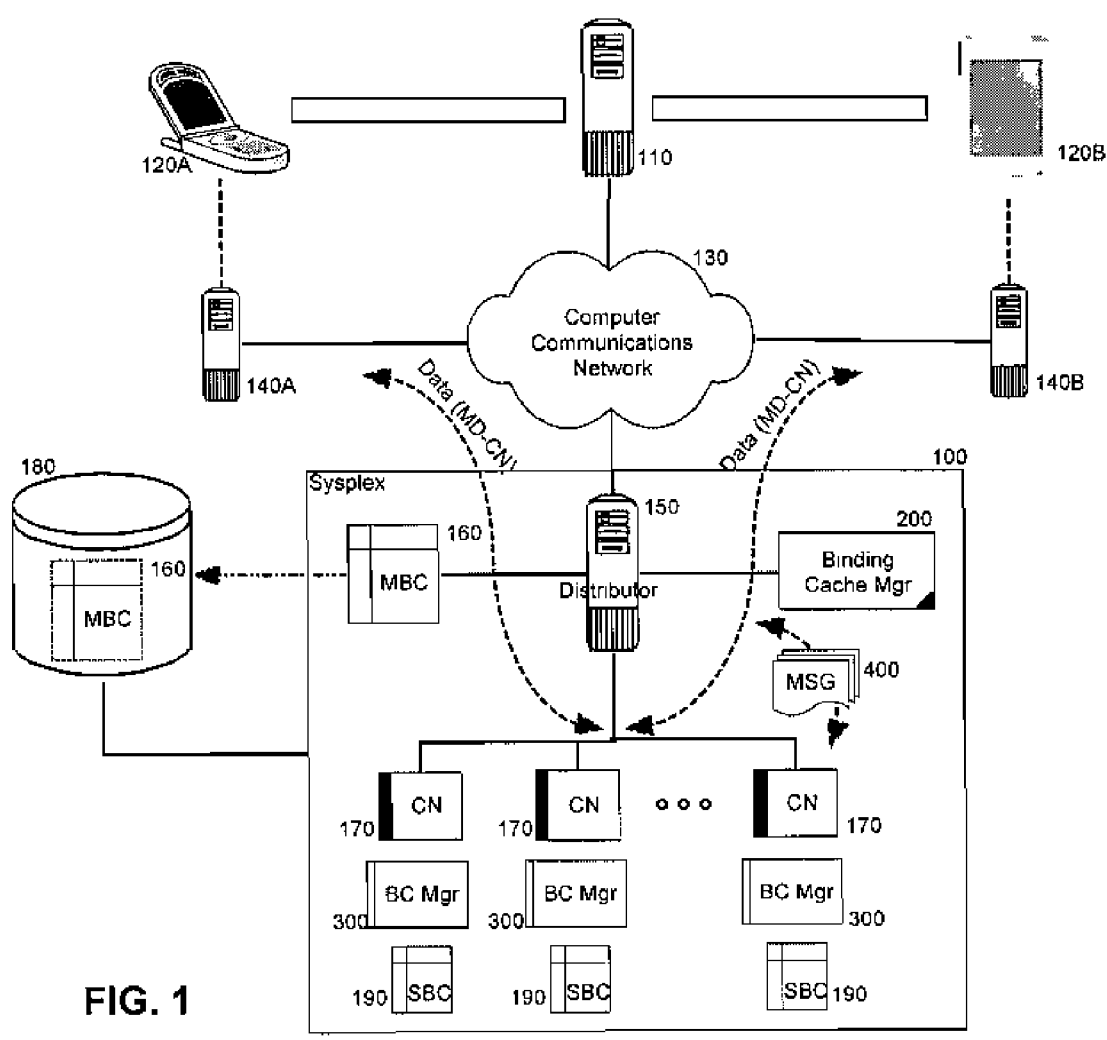
FIG. 1 is a schematic illustration of a load balancing sysplex configured for Mobile IPv6 binding cache support.

In illustration, FIG. 1 schematically depicts a load balancing sysplex configured for Mobile IPv6 binding cache support. As shown in FIG. 1, one or more mobile devices 120A, 120B each providing its own home address can be associated with home addressed host 110 through respective gateways 140A, 140B over global computer communications network 130 in a Mobile IPv6 configuration. Consequently, each of the mobile devices 120A, 120B can be addressable through the home addressed host 110 via secure tunneling, or through a foreign link with the mobile devices 120A, 120B, respectively.

A sysplex 100 can be provided in communication with the global computer communications network 130. The sysplex 100 can include a distributor 150 and multiple different communicatively coupled targets 170. As such, the distributor 150 can load balance inbound requests from the global computer communications network 130 to different ones of the targets. Notably, each of the targets 170 in load balancing inbound requests from the distributor 150, can act as a correspondent node to the mobile devices 120A, 120B such that the mobile devices 120A, 120B can communicate with one another whether or not the mobile devices 120A, 120B are attached to the home addressed host 110.

Notably, the distributor 150 can maintain a master binding cache 160 for the mobile devices 120A, 120B. A binding cache manager 200 can manage the population and maintenance of the master binding cache 160. In this regard, for each of the mobile devices 120A, 120B, subsequent to establishing communication with any of the correspondent nodes in the targets 170, the return routability procedure can be performed as between a communicating one of the mobile devices 120A, 120B and the distributor 150. The results each return routability procedure can be persisted in a record in the master binding cache 160.

Thereafter, the master binding cache 160 can be replicated to each target 170 as a shadow binding cache 190. Optionally, the master binding cache 160 can be disposed in shared memory or storage 180, for example a sysplex coupling facility. Consequently, so long as each target 170 maintains access to the shared memory or storage 180, no shadow binding cache 190 is required. In contrast, to the extent that a shadow binding cache 170 is maintained by each target, binding cache management logic 300 can be disposed in the target 170. The logic can include program code enabled to manage updates to the shadow binding cache 190 and to warn the distributor 150 of persistent failures requiring deletions from the master binding cache 160. The updates, in particular can be provided from distributor 150 to each of the affected targets 170 in the form of a sysplex distributor message 400. Finally, as yet another option, the master binding cache 160 need not be replicated. Rather, each target 170 can access the master binding cache remotely over a remote procedure call or network flow.

Figure 2:
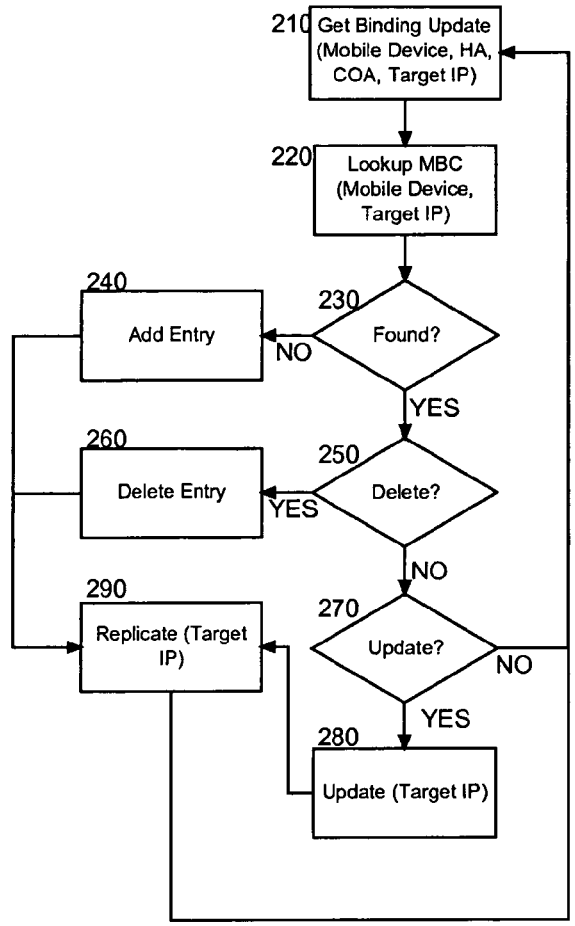
FIG. 2 is a flow chart illustrating a process for Mobile IPv6 binding cache management in a distributor within the load balanced sysplex of FIG. 1.

Turning now to FIG. 2, a flow chart is shown to illustrate a process for Mobile IPv6 binding cache management in a distributor within the load balanced sysplex of FIG. 1. Beginning in block 210, a binding update can be received in the distributor. The binding update can specify a requesting mobile device, a home address, a care-of-address, and a target in the form of a target IP address. In block 220, a record can be located in the master binding cache according to the specified mobile device and target. In decision block 230, if a record cannot be located for the specified mobile device and target, in block 240 an entry can be added to the master binding cache as part of a return routability procedure. Thereafter, the master binding cache can be replicated to the specified target in block 290.

Returning to decision block 230, if a record can be located in the master binding cache for the specified mobile device and target, in decision block 250 it can be determined whether the binding update calls for the deletion of the record from the master binding cache. If so, in block 260 the record can be deleted. Thereafter, the master binding cache can be replicated to the specified target in block 290. Otherwise, in decision block 270 it can be determined whether the binding update calls for the updating of the located record. If so, in block 280 each affected target can be updated within a sysplex distributor message. Thereafter, the master binding cache can be replicated to the specified target in block 290.

Figure 4:
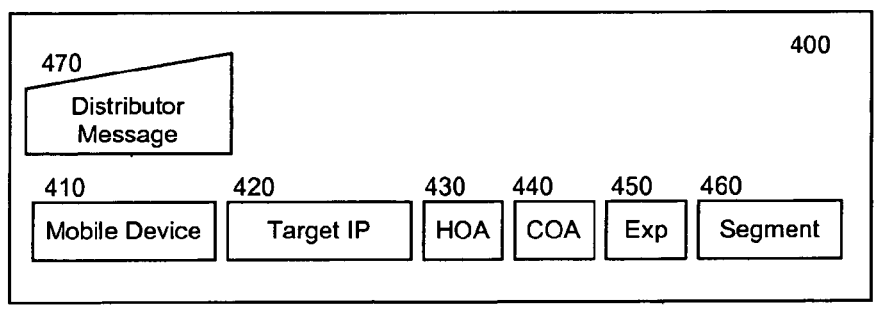

Specifically, the sysplex distributor message can provide not only guidance for routing workloads amongst different targets in the sysplex, but also the sysplex distributor message can include binding cache update data for use by the binding cache management logic in each target. For example, as shown in FIG. 4, a sysplex distributor message 400 can include a distributor message 470 incorporating load balancing data for assigning a workload to a target. Additionally, an identifier for a mobile device 410 bound to the target and a target IP 420 for communications from the mobile device can be specified. Additionally a home address 430 and a care-of-address 440 can be specified. Finally, both expiration data 450 and a last sequence number 460 for a valid binding update message can be provided. The expiration data 450 can indicate when the record for the mobile device in the shadow binding cache is no longer valid and should be deleted from the shadow binding cache, and the last sequence number 460 can indicate an order useful in processing out of order binding update messages.

Figure 3:
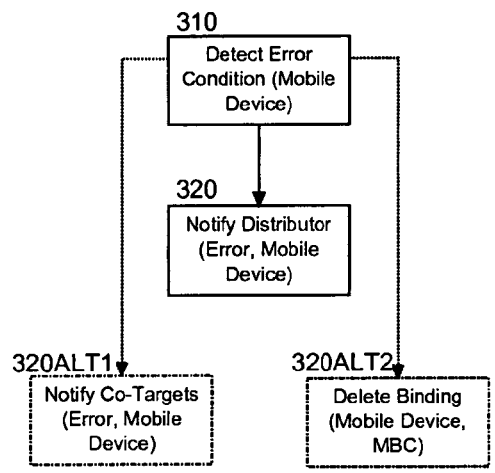
FIG. 3 is a flow chart illustrating a process error condition handling in a correspondent node within a load balanced sysplex of FIG. 1; and, FIG. 4 is a block diagram illustrating a sysplex distribution message arranged for Mobile IPv6 binding cache support in the load balanced sysplex of FIG. 1.

Notably, in the invention each of the targets manages detected failures with entries in the local binding cache. In illustration, FIG. 3 is a flow chart illustrating a process error condition handling in a correspondent node within a load balanced sysplex of FIG. 1. Beginning in block 310, an error condition is detected in a target in connection with a particular mobile device and a corresponding entry in the local binding cache. Subsequently, in block 320, the target detecting the failure can generate and forward a notification message to the distributor which in turn can delete an entry in the master binding cache and can replicate the master binding cache to the local binding cache of the target. Alternatively, in block 320ALT1, the target detecting the failure can directly notify the other targets in the sysplex. As yet another alternative, in block 320ALT2, the target detecting the failure can directly delete the suspect binding entry from the master binding cache.

Returning to FIG. 1, when a single protocol stack owns an IP address, managing the master binding cache 160 requires the participation of the protocol stack in the return routability process performed by the distributor 150. Likewise, binding update messages entries in the master binding cache 160 can be processed in connection with the protocol stack owning the IP address. Still, when an IP address is owned by more than one protocol stack, such as with a distributed dynamic virtual IP address (DVIPA), the mobile nodes 120A, 120B register a binding for Mobile IPv6 on a once per IP address rather than a once per connection basis. As a result, only one of the protocol stacks having a distributed DVIPA will receive binding update messages.

Consequently, the sysplex 100 can maintain the master binding cache on a per stack basis and not on a port basis. Thus, for each distributed DVIPA, the distributor 150 can maintain a listing of all target stacks for a distributed DVIPA. The distributor 150 also can maintain a flag that indicates whether route optimization is supported on a per-DVIPA basis. To the extent that all target stacks for a distributed DVIPA support route optimization, then route optimization is considered to be supported for the DVIPA. Otherwise, if any stack for a distributed DVIPA does not support route optimization, then route optimization is not considered to be supported for the distributed DVIPA.

As a result, route optimization can be managed not in the targets 170, but in the distributor 150 on behalf of the different correspondent nodes in respective ones of the targets 170. Specifically, as packets are received in the distributor 150 from over the computer communications network, packets containing a mobility header for Mobile IPv6 can be inspected and a corresponding one of the targets 170 can be determined for the packet. To the extent that any protocol stack in the corresponding one of the targets 170 is known to the distributor 150 not to support route optimization, the packet can be ignored. Otherwise, the packet can be passed to the corresponding one of the targets 170.

In this regard, the return routability procedure described herein can be performed in a manner consistent with a single store for the keygen tokens and nonce indices. The distributor 150 can perform all return routability procedures and the keygen tokens and nonce indices can be maintained only in the distributor 150. Alternatively, the keygen tokens and nonce indices can be shared by storing the keygen tokens and nonce indices in shared memory or storage such as in the sysplex 100 allowing any node to perform the return routability procedure.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A load balancing sysplex configured for mobile device binding cache support, the sysplex comprising:
    a distributor coupled to a plurality of targets in a load balancing arrangement, each of the targets supporting a correspondent node enabled to communicate with a mobile device;
    a master binding cache coupled to the distributor; and,
    a binding cache manager coupled to the distributor, the binding cache manager performing return routability with the mobile device and providing a corresponding entry in the master binding cache for use by a target supporting a correspondent node for the mobile device.

2. The sysplex of claim 1, further comprising a replica of the master binding cache in each of the targets for use by supported correspondent nodes in communicating with different mobile devices associated with binding cache entries in the replica.

3. The sysplex of claim 1, wherein the master binding cache is disposed in shared memory accessible both by the distributor and the targets in the sysplex.

4. The sysplex of claim 1, wherein the master binding cache is accessed by the targets through remote procedure calls.

5. The sysplex of claim 1, further comprising binding cache management logic in each of the targets, the logic comprising program code enabled to report persistent error conditions in an entry in the master binding cache to the distributor.

6. The sysplex of claim 5, wherein the program code is further enabled to delete the entry from the master binding cache.

7. The sysplex of claim 5, wherein the program code is further enabled to directly notify others of the targets of the persistent error conditions.

8. The sysplex of claim 1, wherein each of the targets comprises a plurality or protocol stacks owning a single Internet protocol (IP) address in a distributed dynamic virtual IP address (DVIPA) configuration, the binding cache manager providing a corresponding entry for the single IP address for the protocol stacks in the master binding cache for use by a target supporting a correspondent node for the mobile device across the protocol stacks.

9. The sysplex of claim 1, wherein the binding cache manager is disposed in the distributor in, a single node performing the return routability and further wherein keygen tokens and nonce indices for the mobile device are maintained in the distributor for access by the binding cache manager.

10. A method for mobile device binding in a load balancing sysplex, the method comprising:
    receiving a binding update request from a mobile device in respect to a correspondent node hosted by a target load balanced in the sysplex;
    performing return routability with the mobile device and updating a binding cache with binding information for the mobile device; and,
    replicating the binding cache to the target for use by the correspondent node in communicating with the mobile device.

11. The method of claim 10, further comprising:
    subsequently receiving an update to the binding information; and,
    forwarding a sysplex distribution message to the target with the update to the binding information.

12. The method of claim 10, further comprising:
    subsequently receiving notice from the target of a persistent error associated with the binding information; and,
    deleting the binding information from the binding cache in response to receiving the notice.

13. The method of claim 10, further comprising:
    subsequently receiving a packet from the mobile device intended for a stack in the correspondent node;
    determining whether the stack supports route optimization; and,
    rejecting the packet where the slack is determined not to support route optimization.

14. A computer program product comprising a computer usable non-transitory storage medium storing computer usable program code for mobile device binding in a load balancing sysplex, the computer program product comprising:
    computer usable program code for receiving a binding update request from a mobile device in respect to a correspondent node hosted by a target load balanced in the sysplex;
    computer usable program code for performing return mutability with the mobile device and updating a binding cache with binding information for the mobile device; and,
    computer usable program code for replicating the binding cache to the target for use by the correspondent node in communicating with the mobile device.

15. The computer program product of claim 14, further comprising:
    computer usable program code for subsequently receiving an update to the binding information; and,
    computer usable program code for forwarding a sysplex distribution message to the target with the update to the binding information.

16. The computer program product of claim 14, further comprising:
    computer usable program code for subsequently receiving notice from the target of a persistent error associated with the binding information; and,
    computer usable program code for deleting the binding information from the binding cache in response to receiving the notice.

17. The computer program product of claim 14, further comprising:
  computer usable program code for subsequently receiving a packet from the mobile device intended for a stack in the correspondent node;
  computer usable program code for determining whether the stack supports route optimization; and,
  computer usable program code for rejecting the packet where the stack is determined not to support route optimization.

* * * * *